United States Patent
Quadracci et al.

(10) Patent No.: US 10,410,146 B2
(45) Date of Patent: *Sep. 10, 2019

(54) ASSOCIATIVE MEMORY LEARNING AGENT FOR ANALYSIS OF MANUFACTURING NON-CONFORMANCE APPLICATIONS

(75) Inventors: Leonard J. Quadracci, Seattle, WA (US); Brian Warn, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1629 days.

This patent is subject to a terminal disclaimer.

(21) Appl. No.: 12/368,047

(22) Filed: Feb. 9, 2009

(65) Prior Publication Data

US 2010/0205121 A1 Aug. 12, 2010

(51) Int. Cl.
*G06Q 10/06* (2012.01)
*G06N 5/00* (2006.01)
*G06N 5/02* (2006.01)

(52) U.S. Cl.
CPC ............ *G06Q 10/06* (2013.01); *G06N 5/003* (2013.01); *G06N 5/02* (2013.01)

(58) Field of Classification Search
USPC .......................................................... 706/12
See application file for complete search history.

(56) References Cited

U.S. PATENT DOCUMENTS

| 5,987,446 A * | 11/1999 | Corey et al. | |
| 2002/0059088 A1* | 5/2002 | Whalen et al. | 705/8 |
| 2004/0098300 A1* | 5/2004 | Karwatowski et al. | 705/11 |

OTHER PUBLICATIONS

Kessler, Bruce. "Math Matters: Why Do I Need to Know This?" 2006 [Online] Downloaded Aug. 8, 2014 https://www.wku.edu/mathmatters/documents/mathmattersep13.pdf.*
http://www.saffrontech.com/saffron-enterprise.shtml—Saffron Technology, Inc., Feb. 10, 2009.
http://www.sra.com/netowl/—NetOwl Entity Extraction and Text Mining Tools, Feb. 10, 2009.

* cited by examiner

*Primary Examiner* — Ben M Rifkin
(74) *Attorney, Agent, or Firm* — Miller, Matthias & Hull LLP

(57) ABSTRACT

A system for assisting a user in determining a cause of a manufacturing non-conformance situation in a manufacturing application. The system may include an associative memory subsystem that is populated with a plurality of entity types, with each entity type including at least one entity, to form an associative memory. A user input device enables a user to input manufacturing non-conformance information into the associative memory subsystem that causes the associative memory subsystem to perform an initial search. The initial search generates a plurality of the entities that has a primary relevance useful for investigating the manufacturing non-conformance situation. An output device is responsive to the associative memory subsystem presents the plurality of entities found during the initial search to the user.

9 Claims, 10 Drawing Sheets

… … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … …

ASSOCIATIVE MEMORY LEARNING AGENT FOR ANALYSIS OF MANUFACTURING NON-CONFORMANCE APPLICATIONS

CROSS-REFERENCE TO RELATED APPLICATIONS

The present application is related in general subject matter to pending U.S. patent application Ser. No. 12/368,024, filed Feb. 9, 2009, entitled "Non-Conformance Analysis Using An Associative Memory Learning Agent," assigned to The Boeing Company, and hereby incorporated by reference in its entirety into the present application. The present application is further related in general subject matter to pending commonly assigned U.S. patent application Ser. No. 12/368,015, filed Feb. 9, 2009, entitled "Employing Associate Memory Learning Agent For Enhanced Lifecycle Management," assigned to The Boeing Company, and hereby incorporated by reference in its entirety into the present application.

FIELD

The present disclosure relates to associative learning memory systems, and more particularly to an associative learning memory system and method that is especially well adapted for use in investigating non-conformance instances in a manufacturing environment.

BACKGROUND

The statements in this section merely provide background information related to the present disclosure and may not constitute prior art.

A challenge in present day manufacturing applications is a lack of capability to rapidly and accurately identify the source of manufacturing non-conformance instances. By "non-conformance" it is meant any situation, instance, or condition that deviates from nominal, and may include any situation, instance, or situation where a problem, fault or inconsistency is suspected to exist while a manufacturing operation is underway, and where such problem, fault or inconsistency may also negatively affect a life cycle of component, subsystem or product being produced by the manufacturing operation. Such a manufacturing operation could be, for example, the manufacture of a large commercial jet aircraft, and a specific manufacturing non-conformance instance could be the discovery of a manufacturing non-conformance, for example a broken electrical connector, at a specific stage of the manufacture of the aircraft.

Complex manufacturing systems typically involve the use of large scale databases and can present especially significant challenges in assisting a person in identifying the root cause (or root causes) of a discovered manufacturing non-conformance. Databases used in complex manufacturing applications often contain a large quantity of diverse information relating to system parts, non-conformance reports, operational histories, process notes and observations by a human observer, etc. Such diverse information can be quite extensive in size. This makes it difficult or impossible for a user to effectively and efficiently analyze all the information available in a manner that enables him/her to identify the root cause of a manufacturing non-conformance.

In addition, the present day database used in manufacturing applications often contain textual content that is input by numerous designers, producers, operators, technicians, maintenance personnel and other contributors. This gives rise to many differences in documentation approach, vernacular and spellings of words, phrases, etc. that describe a manufacturing non-conformance or a particular component parts. Thus, there exists a significant challenge to extract pertinent information from large volumes of current and historical free text, which leads to a multitude of correlation issues that add to the complexity of the manufacturing non-conformance (or inefficiency) analysis. This can also result in a plethora of computational and analytic problems. The usual result is long analysis mitigation times which lead to high costs and unacceptable delays in a manufacturing process, and which can be highly burdensome to an organization, or simply unacceptable for many businesses and governmental operations. Thus, with traditional analysis, the root cause of many manufacturing non-conformances may rarely be discovered because it simply takes too much time to thoroughly investigate a given manufacturing non-conformance. As a result, engineers or technicians may be forced to simply replace a component or modify an assembly process to ameliorate the immediate issue without ever determining the root cause of the non-conformance.

In addition to the above limitations, present day manufacturing quality monitoring or analysis systems typically do not allow for whole text capture, and are thus limited in their ability to relate specific types of information having to do with a given manufacturing non-conformance. By "whole text capture" it is meant using all the words that a user selects to describe a specific manufacturing issue. Furthermore, modern data mining solutions used in connection with present day relational databases are typically reductive and may not provide for the use of certain information (e.g., words or numbers) provided by the user in an initial manufacturing non-conformance query. These reductive solutions tend to lose the subtleties of the data that often are key in determining desirable patterns that do not repeat often. Such systems are often "forced" into characterizing specific information or attributes by pre-defined characteristics. For example, many database systems have drop-down menus that allow for only certain categories or to be chosen. The categories may not contain enough detail to adequately address all the associations between different types of information, and this may result in the system omitting relationships that can be of significant assistance in determining a desired result or that may assist in an analytical process. For example a relational database might force a particular non-conformance to be described as "connector did not work". However, the true nature of the non-conformance might be most accurately described as "connector pin bent", or "connector not tightened sufficiently". Thus, the user may not be able to most accurately describe the manufacturing issue in his/her initial inquiry to the system, and this inability results in the system not having all of the useful non-conformance inquiry information that fully describes the issue.

Also, modern data mining solutions are time consuming and costly in terms of manpower hours. Such data mining systems are also typically processor intensive in their operation. This often results in long times for the data mining system to obtain the information that may be relevant to a lifecycle management system.

SUMMARY

In one aspect the present disclosure relates to a system for assisting a user in determining a cause of a manufacturing non-conformance situation in a manufacturing application. The system may include an associative memory subsystem that is populated with a plurality of entity types, with each entity type including at least one entity, to form an associative memory. A user input device enables a user to input manufacturing non-conformance information into the associative memory subsystem that causes the associative memory subsystem to perform an initial search. The initial search generates a plurality of the entities that have a primary relevance useful for investigating the manufacturing non-conformance situation. An output device is responsive to the associative memory subsystem presents the plurality of entities found during the initial search to the user.

In another aspect the present disclosure relates to a method for assisting a user in determining a cause of a manufacturing non-conformance situation in a manufacturing application. The method may comprise providing an associative memory subsystem that is populated with information involving a plurality of entity types, with each entity type including at least one entity, to form an associative memory. Each entity may relate to a specific attribute of the information. A user input device enables a user to input a manufacturing non-conformance query into the associative memory subsystem that causes the associative memory subsystem to perform an initial search. The initial search generates a plurality of the entities that include information useful for investigating the manufacturing non-conformance situation. An initial output is generated from the results of the initial search that provides the user with the plurality of entities that has a primary relevance useful for investigating the manufacturing non-conformance situation.

In another aspect the present disclosure involves a method for forming a manufacturing non-conformance analysis system. The method may comprise defining relevant entities that contain attributes of information that pertains to a manufacturing application. At least one information tool is used to store the information. Data mining is performed to obtain specific portions of the information stored in the information tool. The specific portions of the stored information are used to populate the entities and to form an associative memory system with the populated entities. An entity analytics engine is used that is adapted to receive a manufacturing non-conformance search query from a user. The entity analytics engine is adapted to search the associative learning memory system for specific ones of the entities that are relevant to the manufacturing non-conformance query.

In another aspect the present disclosure relates to an associative learning memory adapted for use in a manufacturing environment to assist a user in analyzing a manufacturing non-conformance situation. The system may comprise an associative memory system for storing previously defined entities, where the previously defined entities relate to different attributes of information pertinent to a manufacturing situation, and where each entity includes specific information relating to a specific one of the attributes. An entity analytics engine is adapted to receive a manufacturing non-conformance query from a user. The entity analytics engine also performs an initial search of the associative memory system for specific ones of the entities that are related to information provided in the manufacturing non-conformance query, and provides the specific ones of the entities to the user for analysis.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
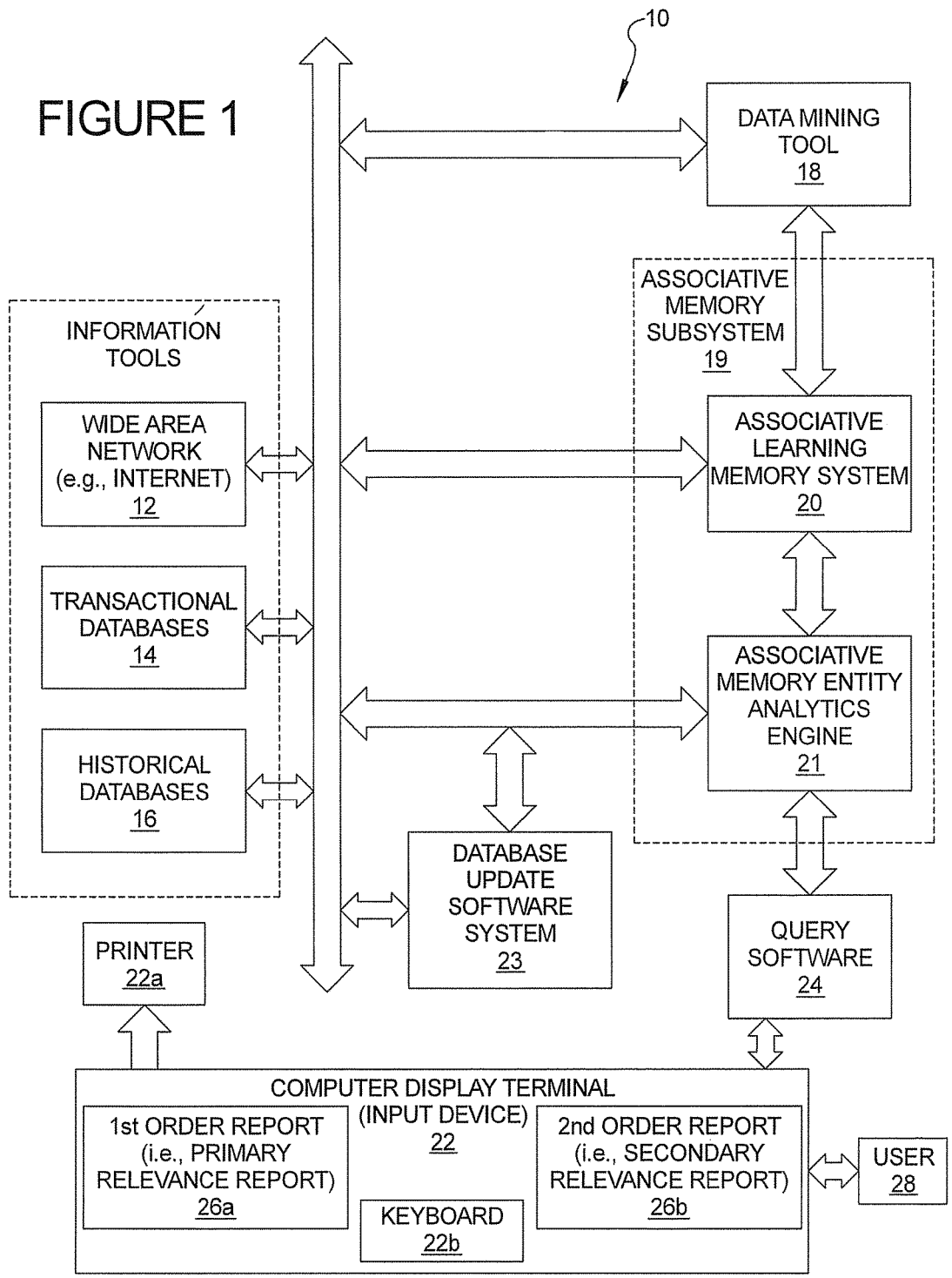
FIG. 1 is a block diagram of a system in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, there is shown a lifecycle management system having an associative learning agent 10, and which will be referred to throughout the following discussion for convenience as "the system 10". The system 10 is suited for use in any application where lifecycle management analysis of a system or process is required, or where a manufacturing non-conformance investigation is required. While the system 10 is especially well suited for large, complex systems and products, for example the troubleshooting of commercial aircraft, it will be appreciated that the system may be adapted for use with much smaller and less complex systems, products and methods. The present system is therefore expected to find utility with a wide variety of systems, products and methods where rapid, manufacturing non-conformance analysis is required.

Referring to FIG. 1, the system 10 may include one or more diverse independent information storage tools where various forms of non-conformance information may be stored. Three such exemplary information storage tools are illustrated as a wide area network cite 12 (for simplicity simply "web 12"), one or more transactional databases 14 and one or more historical databases 16. However, it will be appreciated that any type of database or information storage system capable of storing useful non-conformance related information may be used with the system 10. Historical database 16 may be used to store historical non-conformance information concerning subsystems, component parts, vendors or any other criterion that may prove useful in non-conformance analysis. Transactional database 14 may store reports involving specific types of issues previously investigated, for example assembly non-conformances or anomalies, test anomalies, reports by engineers or maintenance personnel on what action was taken to remedy an anomaly or even what repair action(s) had no effect on the anomaly. Transactional databases may also contain on-line standards documentation or trade journals that describe non-conformances or changes in materials or manufacturing technology. As another example of useful information that may be stored in one or more of the databases 14 and 16, consider the situation when there is a change in the way a part for a subsystem is manufactured, and then at some future time other users (or even users in a different industry) discover a non-conformance and report information pertaining to the non-conformance. It might take considerable time to determine that the particular non-conformance could be common across industries. As one specific example, assume that the coating on a wire bundle was changed to reduce potential environmental impact. The wire with coating is used by many different industries. Now assume that it is typical to mark with stickers to identify (ID) the different wire ends to ID the destination component during manufacturing. Now also assume that the sticker glue is not compatible with the new formulation of the wire bundle coating and causes the wires to short. Now an individual working in one industry discovers the non-conformance and reports the issue in a trade journal. If the relevant information from the trade journal is stored in one or more of the databases 14 or 16, a user in a different industry facing the same or a similar non-conformance may use the system 10 to query and learn all the pertinent information stored that concerns this specific wire non-conformance. The attributes of a given subsystem that makes use of the wire bundle may include that it is made up of this specific type of wire (e.g., part of the bill or materials associated with every subsystem). And because it has this wire attribute, that specific wire will associate this subsystem with the journal entry that describes non-conformances associated with the specific subsystem that uses the wiring bundle.

Thus, it will be appreciated that manufacturing non-conformance situations requiring analysis by the system 10 may occur in manufacturing processes, with independent components or parts, with coatings, with raw materials, or may be caused by individuals or even teams of individuals. As such the system 10 may be supplied with whatever form of information or data that may be helpful in performing manufacturing non-conformance analysis investigation. The information tools 12, 14 and 16 may also include textual content that has been supplied by a plurality of designers, engineers, scientists, producers, operators, technicians, maintenance personnel and other contributors, so differences in documentation approach, terminology, vernacular and even spelling of non-conformance conditions and related information may be present.

With further reference to FIG. 1 the system 10 also may include a data mining tool 18 and an associative memory subsystem 19. The associative memory subsystem 19 may include an associative learning memory 20 (hereafter simply "associative memory 20") and an associative memory entity analytics engine 21 (hereinafter the "entity analytics engine 21"). An input device such as a computer display terminal 22 having a keyboard 22b may communicate bidirectionally with the entity analytics engine 21 via entity analytics query software 24. The associative memory 20 is in bidirectional communication with the entity analytics engine 21. The entity analytics engine 21 may make use of one processor, but more typically a plurality of processors, that operate in connection with the entity analytics query software 24 to perform queries for information stored in the associative memory 20. The entity analytics engine 21 receives non-conformance queries from the query software 24 from a user 28 via the keyboard 22b of the computer display terminal 22 and controls the generation of the pertinent entity types and entities for a given input query by the user. The entity analytics engine 21 determines what attributes are relevant to the manufacturing non-conformance input query being made and retrieves all of the specific entities (relating to various different entity types) that have information that meets one or more of the attributes relating to the manufacturing non-conformance input query. Any such information is retrieved from the associative memory system 20. By the terminology "attributes" it is meant any characteristic associated with an entity. For example, attributes associated with a "non-conformance" entity might include a part number, a process step, a manufacturer name, an assembly line number or build date, a technical or service bulletin, etc.

A database update software system 23 is used to update the information tools 12, 14 and 16 with any documents created by the user, such as reports concerning a successful resolution of a non-conformance being investigated, or any other information that the user wishes to input that may be of interest in future non-conformance analysis of the same or similar non-conformances. The entity analytics engine 21 periodically updates the associative memory 20 with new information retrieved from information tools 12, 14 and 16 so that the information concerning entities and entity types stored in the associative memory 20 will contain all of the information available to the system 10 when the system is next accessed for use by a user.

Prior to a first use of the system 10, a system designer defines at least one entity type, but more typically a plurality of entity types that relate to specific categories of information that may be used to help evaluate a specific non-conformance for a specific application. Each specific entity type will further have associated with it at least one, but more typically a plurality of different specific entities. For example and without limitation, entity types may be the names of vendors that supply component parts; mobile platform models; types of parts (e.g., fastener, spring, etc.); or the names of customers that own the device or mobile platform being analyzed for a non-conformance, the names of subsystems of the mobile platform, device or system that is the subject of the manufacturing non-conformance investigation; specific serial numbers of vehicles, subsystems or parts, etc. Entity types can thus be thought of as different categories of types of information (or even different ways or perspectives to remember the information) that may be useful in the lifecycle management process.

In a manufacturing non-conformance application, each entity may represent an object (either physical or logical) that is significant to the manufacturing business or operation. Each entity may contain one or more attributes that describe the entity or how the entity relates to other entities. For example and without limitation, an entity type of "part number" may have several different attributes associated with it (e.g. name: Fastener, Size: 6", Color: Green) and it may have several different entities associated with it too (e.g. Manufacturer: ACME, Serial number: 00010, 00011, 0012). Thus, for an entity type of "PartNumber", different entities might exist for a specific style/type of rivet, a specific sized threaded bolt; a specific size of cotter pin, a specific sized nut, etc. As another example, a specific entity type may be created for an "aircraft model", and may have several specific entities associated therewith that each specify a different, specific model of aircraft. As a further example, a specific entity type called "serial number" might be created, and it may have a number of specific, different entities associated therewith that each list a specific serial number. So a free text inquiry by the user for non-conformance information concerning a specific serial number of a part or subsystem could be input and the associative memory software system 20a would generate all non-conformance query information relative to that specific serial number. All of the entity types and entities are stored in the associative memory 20.

The computer display terminal 22 may be used by a user of the system 10 to input free text queries via the keyboard 22b to the associative memory 20 that pertain to the non-conformance being investigated or to non-conformance information, typically in the form of a non-conformance report or non-conformance query, that may be analyzed by the system 10. For example, a free text query might comprise a statement such as "Part XXX was found to have a delamination issue" that is input through the computer display terminal 22 to the entity analytics engine 21 via the query software 24. The ability to receive free text inputs is a significant advantage of the system 10 because it enables all data defining the non-conformance parameters to be used in the query. Another method of analysis would be to select a non-conformance report and ask the entity analytics engine 21 to find other non-conformance entities that are similar to the one being analyzed. Another significant advantage of the system 10 is that it does not make use of reductive algorithms, which can actually eliminate some portions of input information that describe or characterize the non-conformance that could be helpful in examining the non-conformance condition. Such reductive algorithms typically categorize various non-conformance issues into specific categories. Thus, the user is able to learn how many "types" of non-conformances are similar to the current non-conformance but is not informed of the non-conformance information stored in the associative memory that are most like the current non-conformance.

Figure 2:
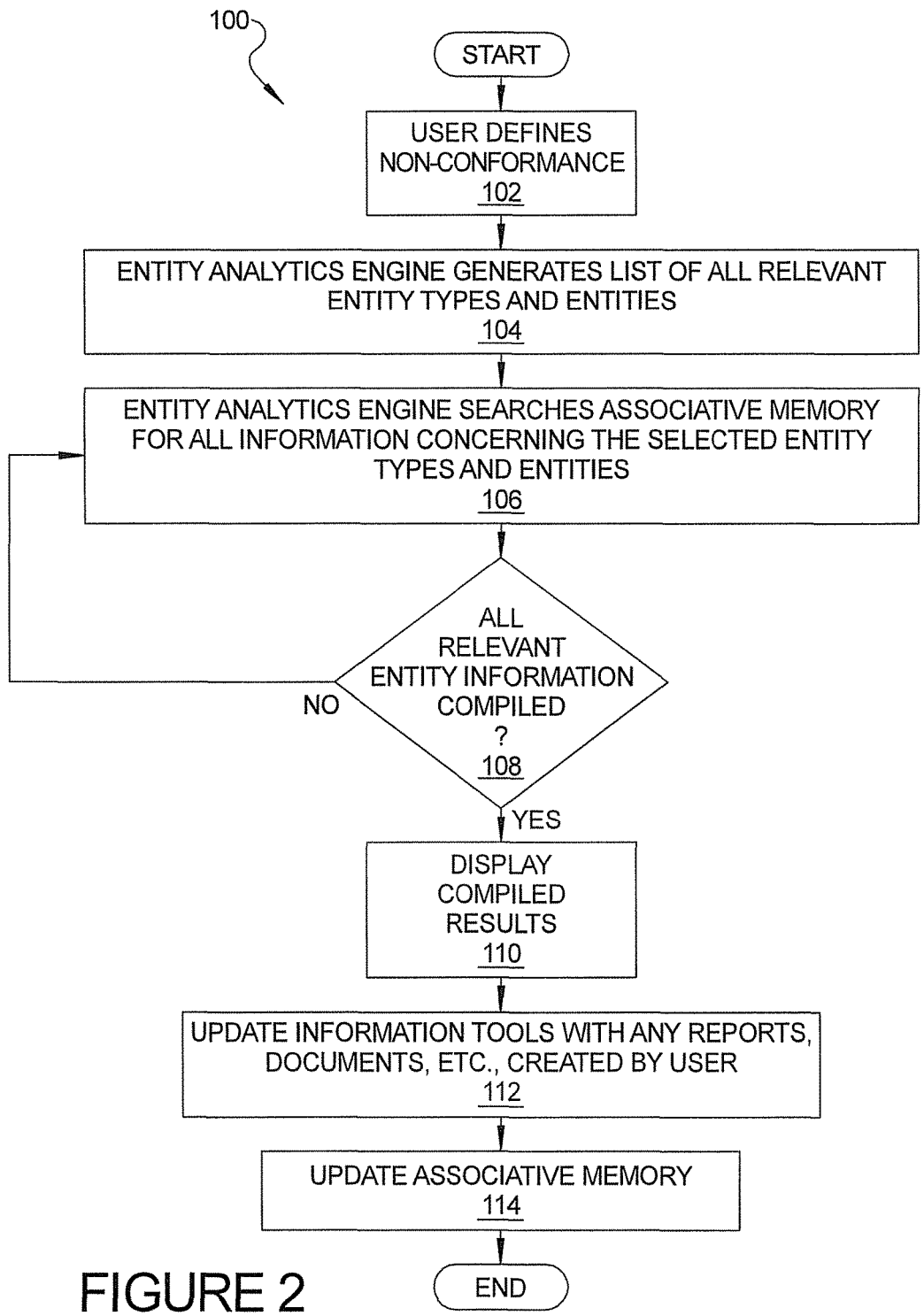
FIG. 2 is a flowchart illustrating one method for constructing the system of FIG. 1.

Referring now to FIG. 2 a flowchart 100 is shown of operations that are performed by the system 10 during a manufacturing non-conformance analysis. At operation 102 the specific non-conformance is defined by the user via the computer display terminal 22. Again, as an example, the specific non-conformance might be defined in free text form as a text entry that reads: "Wing corrosion on a model XXX aircraft manufactured by ZZZ company". Alternatively, the user may enter a model name of a mobile platform, a part number of a specific part under investigation; a specific serial number of an assembly under investigation, etc. For the purpose of this example it will be assumed that the user provides a free text query.

The system 10 uses the entity analytics engine 21 to perform entity analytics searches on all of the words that make up the free text query, as indicated at operation 104. This determines all of the relevant entities (or various entity types) that are associated with the manufacturing non-conformance query. At operation 106 the entity analytics engine 21 then searches the associative memory system 20 to retrieve information having specific attributes for each associated entity. This search is performed with a focus on how the attributes are associated with the manufacturing non-conformance being investigated. This operation is repeated with successive queries by the entity analytics engine 21, as indicated by query 108, until all the relevant entity and entity type information is compiled. At operation 110, the system 10 may generate a report of the search results that is sent to the computer display terminal 22 for display. This report would include all of the information associated with all entity types and all of the entities for each entity type. Typically this information may be generated within a few seconds or less from the time the user enters a description of the manufacturing non-conformance being investigated. At operation 112 the information tools 12, 14 and 16 may be updated via the database update software system 23 with any information that the user has created after reviewing the entity type and entity information. At operation 114 the entity analytics engine 21 may update the associative memory 20 with any new information that was stored in the information tools 12, 14 and 16. This updating may involve populating existing entities with additional specific information or even creating new entities (e.g., by adding part numbers of additional parts, as new entities, that have been discovered to be pertinent to the performance of a particular subsystem or component).

Figure 3:
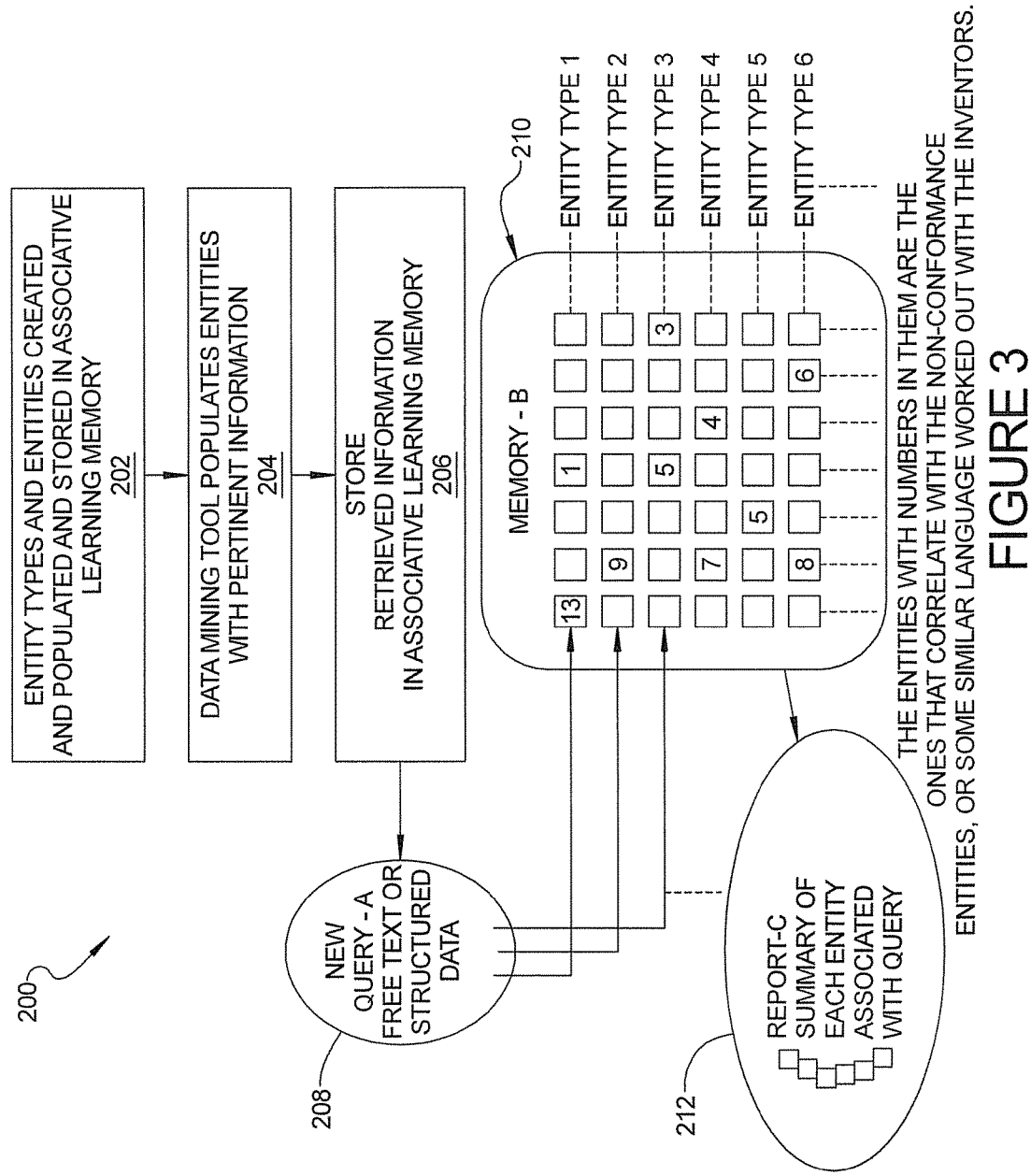
FIG. 3 is a diagram illustrating how the system of FIG. 1 may be used.

Referring now to FIG. 3, a diagram 200 of an operational flow of one embodiment of the system 10 is shown. At operation 202, prior to the first use of the system 10, the entity types and entities that may be pertinent to manufacturing non-conformance analysis for a specific application are defined for the associative memory 20. Thus, for example, for manufacturing non-conformance analysis of a specific commercial aircraft, specific entity types might be of the major subsystems of the aircraft, and the entities might include the specific components associated with each entity. At operation 204 the data mining tool 18 identifies information having attributes relating to the newly defined entities, and retrieves and stores the information from all of the information tools 12, 14 and 16 in the associative memory 20 so that the attributes are correlated with the previously defined entity types. The retrieved information may thus involve historical data concerning specific subsystems as well as specific components parts of specific subsystems. Other exemplary historical data could involve historical repair information, subsystem use data, planned and unplanned maintenance actions and information, and service advisories, just to name a few. All of the manufacturing non-conformance information retrieved from the information tools 12, 14 and 16 is stored in the associative memory 20 at operation 206 and categorized in accordance with the previously defined entities.

At operation 208, when a manufacturing non-conformance is to be investigated, a user enters pertinent information as free text or as structured data into the computer display terminal 22. At operation 210 the entity analytics engine 21 of the associative memory 20 analyzes all of the terms or structured data input by the user at operation 208 and determines the entity types and entities for which information needs to be obtained from the associative memory 20. Essentially, the associative memory queries performed by the entity analytics engine 21 involve successive queries of the associative memory 20 to obtain all of the relevant information pertaining to the selected entity types and entities. For example, one associative memory query may focus on the word "corrosion" that is part of a free text entry by the user describing a non-conformance condition being investigated. The entity analytics engine 21 may retrieve all of the pertinent entities types and the specific entities that correlate with the information provided by the user. This operation may be viewed as a "knowledge/discovery" operation in which the entity analytics engine 21 accesses the associative memory software 20a to find and extract all of the pertinent, saved information available in the associative memory 20 that pertains to the entity types and entities that it has selected. The obtained information is then presented in a logically organized format by the entity analytics engine 21 to the computer terminal 22, as indicated by diagram 210.

Importantly, the entity analytics engine 21, through its repeated searching of the associative memory 20, returns information that also indicates how well correlated the retrieved entities and entity types are with the manufacturing non-conformance information provided. As one example, the entity analytics engine 21 may indicate with a numerical value how many times a specific entity came up during the multiple memory queries that were performed by the entity analytics engine 21. Alternatively, the entity analytics engine 21 may provide other information that indicates more generically how strongly each of the retrieved entities and entity types are correlated with the manufacturing non-conformance information input by the user. For example, the strength of correlation of each specific entity could be represented to the user through the use of different colors when displaying the specific entities that are retrieved. For example, if a particular entity came up only once, then the color white could be the background used to display that particular entity on the computer display terminal 22. However, any entity that came up three times or more could be displayed with a red background. These colors could of course be used in addition to numbers to indicate the exact frequency that each particular entity came up. Another alternative to help illustrate the strength of correlation could be the use of different font sizes for numbers displayed for each specific entity. For example, if a specific entity came up only once, it might be displayed in ten point type size, but any entity that comes up three times or more could have a number associated therewith that is displayed in sixteen point size. The resulting entity types and entities retrieved by the entity analytics engine 21, as well as the correlation information it provides, thus present the user with disparate ways (i.e., one for every related entity type) in which to view and investigate the specific manufacturing non-conformance being analyzed.

Figure 4:
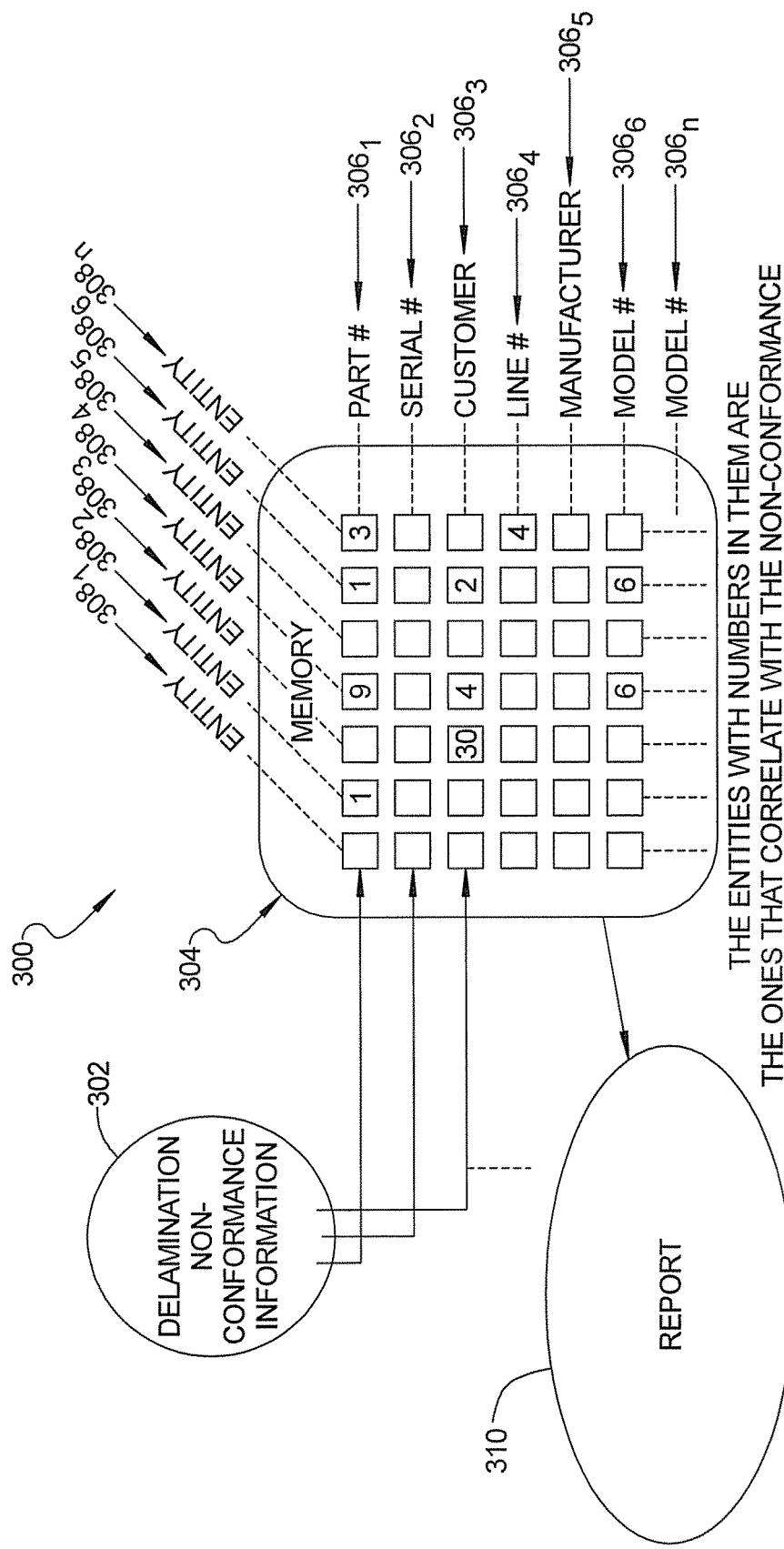
FIG. 4 is a diagram illustrating how the system correlates entities in the memory with the information in the non-conformance query to obtain non-conformance information concerning a specific non-conformance involving delamination on an aircraft.

Referring now to FIG. 4, an operational diagram 300 is provided to help illustrate a specific example of how the system 10 operates. The specific example relates to the "delamination" non-conformance mentioned earlier herein. At operation 302 a free text query may be entered by the user designating "delamination" as the manufacturing issue to be investigated. At operation 304 the entity analytics engine 21 sequentially performs a plurality of queries to retrieve from the associative memory 20 the information that pertains to the entity types and specific entities previously selected. The entity types are arranged in rows in this example denoted by reference numbers $306_1$-$306_n$. Thus, in this example the entity types "Part #", "Serial #", "Customer Name"; "Line #"; "Manufacturer Name"; and "Model #" are retrieved as all of the pertinent entity types. In actual practice, however, typically dozens or more entity types and dozens, or even hundreds or more entities may be retrieved that all relate to some attribute or facet of the manufacturing non-conformance information that the user has provided through his/her free text query. All of the entities associated $308_1$-$308_n$ associated with each of the entity types $306_1$-$306_n$, respectively, are also retrieved. A number may be provided with each entity $308_1$-$308_n$ indicating the number of times that each specific entity turned out to be involved previous manufacturing non-conformance investigations. For example, number "10" in the entity type row $306_1$ in FIG. 4 might denote that a specific part number was associated with the delamination non-conformance ten times. Similarly, the number "9" in the "Customer Name" entity type row $306_3$ would indicate that a particular customer was somehow involved on 9 occasions with the delamination non-conformance being investigated. Likewise, the number "4" in row $306_4$ would indicate that a particular assembly line was involved four times with the delamination non-conformance being investigated. An entity $308_1$-$308_n$ that does not have a number indicates that it is not associated with the manufacturing non-conformance information provided by the user.

At operation 310 the information collected from the associative memory 20 at operation 304 is presented in a user friendly format to the user, possibly in a printed report or on the computer display terminal 22. From the entity type information, the entity information, and the numbers associated with the occurrence frequency of each specific entity, the user is able to quickly assess which entities may be highly pertinent to resolving the specific manufacturing non-conformance investigation undertaken. The associative memory 20 effectively retrieves all types of previously stored information that may have a bearing on the specific non-conformance being investigated, as well as retrieving information on specific entities of each entity type that have previously been associated with a similar manufacturing non-conformance situation seen in a prior investigation.

Figure 5:
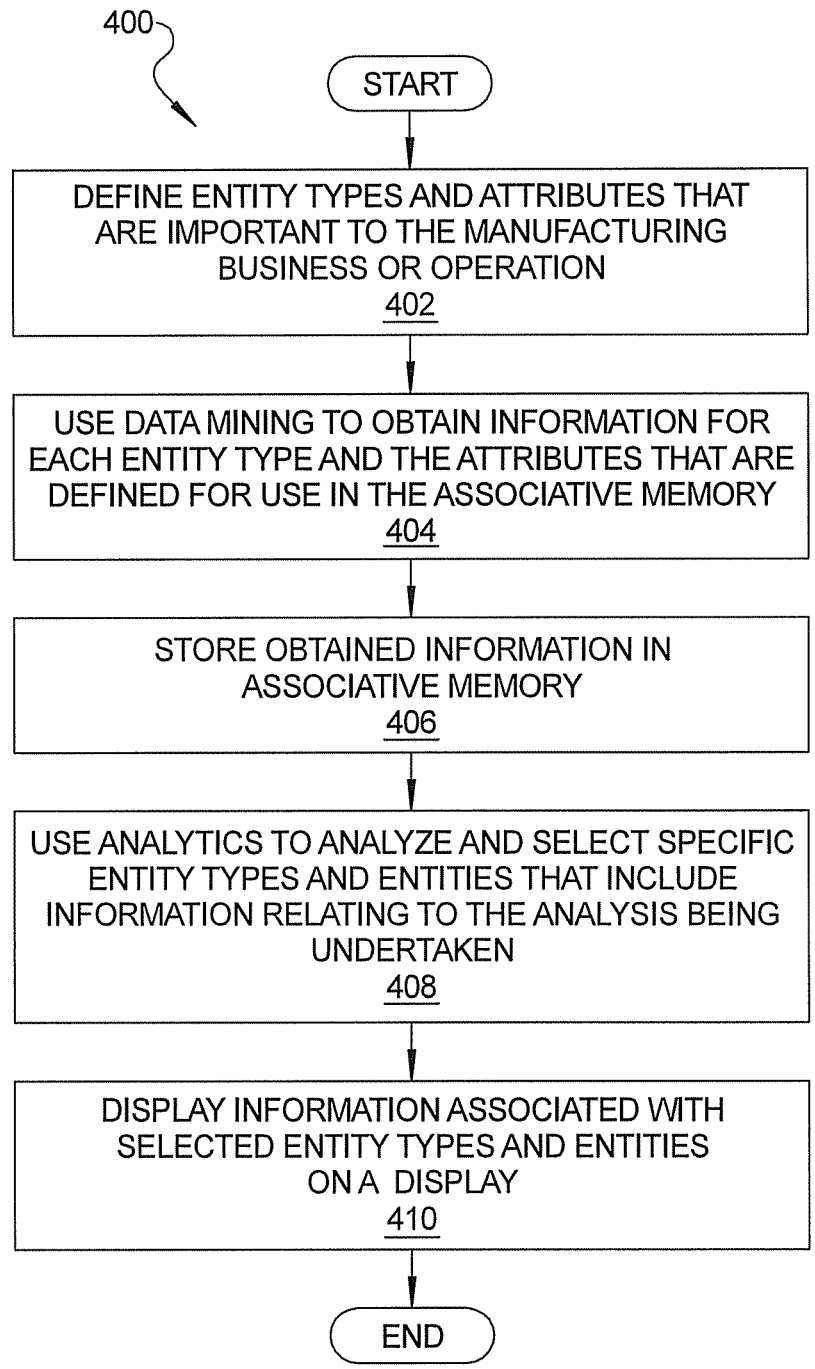
FIG. 5 is a flowchart specifically illustrating operations formed in creating an associative memory for use with the present system and then using the system.

Referring to FIG. 5, a flowchart 400 is shown of operations that may be performed to form an associative learning memory and use it to analyze a manufacturing non-conformance. At operation 402 the entity types and attributes that are of interest to a manufacturing business or operation are defined by the system designer. At operation 404 data mining of previously stored information from a plurality of information tools is performed to obtain specific information relevant to the entity types and the attributes that are defined for use in the associative memory 20. At operation 406 specific information, including entities of various entity types and attributes of those entities, obtained during the data mining operation is stored in the associative memory 20. At operation 408 analytics are used to analyze the stored, specific manufacturing non-conformance information and to retrieve specific ones of the entities that include information pertinent to the specific analysis being undertaken. At operation 410 the obtained entity types and the information associated with their associated entities may be displayed to a user 28 on a suitable display, for example on computer display terminal 22.

Figure 6:
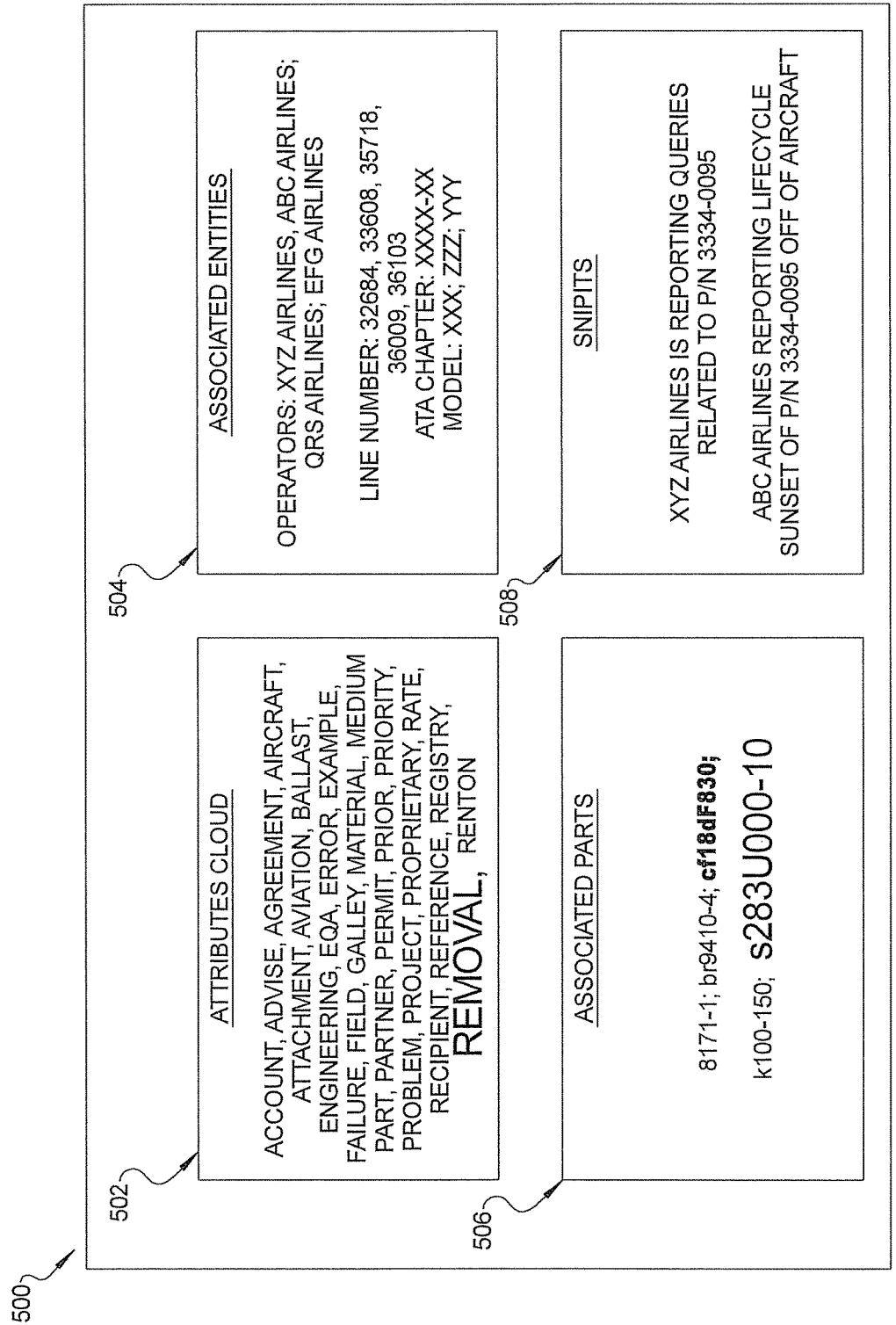
FIG. 6 is an illustration of one exemplary format in which entity type and entity information obtained from the associative memory system may be presented to the user for consideration.

Referring to FIG. 6, one exemplary arrangement is shown in diagram 500 for presenting the entity and entity type information obtained from the associative memory 20 searching to a user. It will be appreciated that this information may be displayed on the computer display terminal 22 or possibly just printed out from a printer (not shown) in communication with the computer display terminal 22. The diagram 500 shows an "Attributes Cloud" box 502, an "Associated Entities" box 504, an "Associated Parts" box 506 and a "Snippets" box 508. The Attributes Cloud box 502 lists attributes (i.e., represented by words) that relate to any of the terms input by the user in the initial query. One particular attribute, "removal", is shown in bold print to signify that this attribute came up more frequently than the other attributes as the associative memory 20 queries were performed by the entity analytics engine 21 on the content stored in the associative memory 20. The "Associated Entities" box 504 shows the entity types pulled up from the associative memory searching 20 as being airline "Operators" and "Line Number". The four specific airlines that came up during the searching (i.e., "XYZ Airlines", "ABC Airlines", "QRS Airlines" and "EFG Airlines") imply that these specific four airlines are relevant to one or more of the search terms used in the query input by the user. Entity types "ATA Chapter" and "Model" also came up, along with several specific entities for each (e.g., specific aircraft model numbers for the "Model" entity type). This means that these specific entities are involved with, or match, one or more of the search terms used in the query. The "Associated Parts" box 506 lists specific part numbers (which represent specific entities) that came up during the associative memory 20 searching that are somehow connected with, or correlated to, one or more of the search terms used in the initial query. The last number (i.e., s283U000-10) is shown in enlarged and bold face print, indicating that it came up more frequently than any other part number during the associative memory 20 searching. The "Snipits" box 508 provides short summaries of particular reports that came up in the associative memory 20 searching, and that involve one or more of the search terms used in the inquiry input by the user. From this collective information, the user is able to quickly focus in on those entity types and specific entities that have a direct bearing on the non-conformance being investigated.

The system 10 and method described herein provides a number of significant advantages over previously developed relational databases that have traditionally been used for manufacturing non-conformance investigation work and analysis. A central overall advantage of the system 10 is its ability to rapidly correlate multiple sources and multiple formats of informational data—including free text formats—and present it in such a way that a user can rapidly and accurately determine the source of the non-conformance by looking at the entities associated with the non-conformance and focusing in on how the non-conformance is associated with those entities.

The system 10 can also answer other related questions without re-building the structure of the memory entities. The advantage of associative memory/entity analytics ("AMIEA") implementations is that because one can have such a large number of different entity types, one can answer and discover different questions. In the associative memory 20 of the present system 10, when something is "observed" by the system 10, it is recorded in the associative memory 20 for every related entity that is observed as being related to the non-conformance information being input by the user. In a relational database the information is stored only once in the location chosen by the database designer. Because it is stored in one way it can be accessed only in one way, typically through the key that defines that specific table in a relational database.

Another significant advantage of the system 10 is that the system 10 may use all available manufacturing non-conformance information/data provided by the user when performing the associative memory 20 queries. It does not, as other previously developed systems typically do, store a summarized version of the information being input by the user in order to reduce the scope of the potential issue (i.e., the scale of the searching that will be done) to something that works with the technology, and in so doing lose important or otherwise useful facts present in the source data. Existing relational database manipulation tools can find keywords, but the perspective is always that of the relational database designer, not the entity that relates to the current non-conformance issue. Relational databases also generally do not account for all the entities that reside in the free text information provided by the user. Relational databases further are often slow and difficult to manipulate. The present system 10 can typically provide responses to user inputs within a second or less, while a typical relational database may require significantly longer times to search and obtain relevant, stored information.

The system 10 also does not rely on rules based systems, which also may suffer from the drawback of eliminating potentially useful portions of the information contained in the initial manufacturing non-conformance inquiry made by the user. This is because the "rules" that are used to find "relevant" data by their very nature limit the flexibility of the system to the implemented rules. The other drawback with rules based systems is that the number of rules required will grow with the size of system and the increasing quantity and types of information that must be accessed and searched. So as a rules based system grows larger and larger, it become more unmanageable.

When the system 10 is used as a manufacturing non-conformance analysis system, it can provide sufficiently detailed information to enable a user to find the root cause of a manufacturing non-conformance or issue. Such an implementation will now be discussed in even greater detail with reference to FIGS. 7-9. When used as a manufacturing non-conformance analysis system, it will be appreciated that the information tools 12, 14 and 16 of FIG. 1 will include information that is pertinent to the manufacturing environment in which the system 10 is being used. For example, the historical database 16 may include information (e.g., written reports) that detail non-conformances discovered with an assembly procedure for a component used on a mobile platform, for example a commercial jet aircraft. Another example would be information on overall vendor quality for each component being used on the mobile platform.

Manufacturing non-conformance information can also be related to specific parts, maintenance and test processes, materials, coatings, and may be organized by vendors, by individuals, etc. A variety of sources such as the wide area network 12 (e.g., the Internet) and transactional databases 14 may also be used to provide information such as reports on a manufacturing non-conformance occurrence. The system 10 overcomes the drawbacks with previous systems where obtaining useful correlations in manufacturing non-conformance from similar sources (e.g., a coating used on different parts or parts from a common vendor) can take an unacceptably long time to analyze. Repeating non-conformances can be costly and unacceptable in a manufacturing application.

When the system 10 is used in a manufacturing non-conformance application the entities and entity types are selected by the system designer to represent attributes or features that are pertinent to a manufacturing environment or application, rather than to a post-production or lifecycle management system. This may involve the system designer selecting entity types and entities that relate to non-conformances or anomalies that will only (or mostly) be seen during the manufacture or assembly of a product or system. One example of a manufacturing non-conformance issue may be related to a connector that does not fit a receptacle on an electronics module that it is to be connected to. Another example might be an adhesive coating that does not adhere satisfactorily to permit a subsequent assembly operation to be performed. Still another example might be a wiring harness that turns out to be the wrong type of harness for connecting two or more subsystems. In a manufacturing application, the computer display terminal 22 may be used to enter a free text query comprised of words, phrases, part numbers, symbols or any other information that helps to fully describe the manufacturing non-conformance being investigated. The computer display terminal 22, or possibly a printer 22a in communication with the terminal 22, may be used to display (or print) information concerning specific entities and entity types that is/are retrieved by the system 10 and provided to the user. Again, the display of such entities may be presented in any fashion that makes the information easily and quickly understood by the user.

Figure 7:
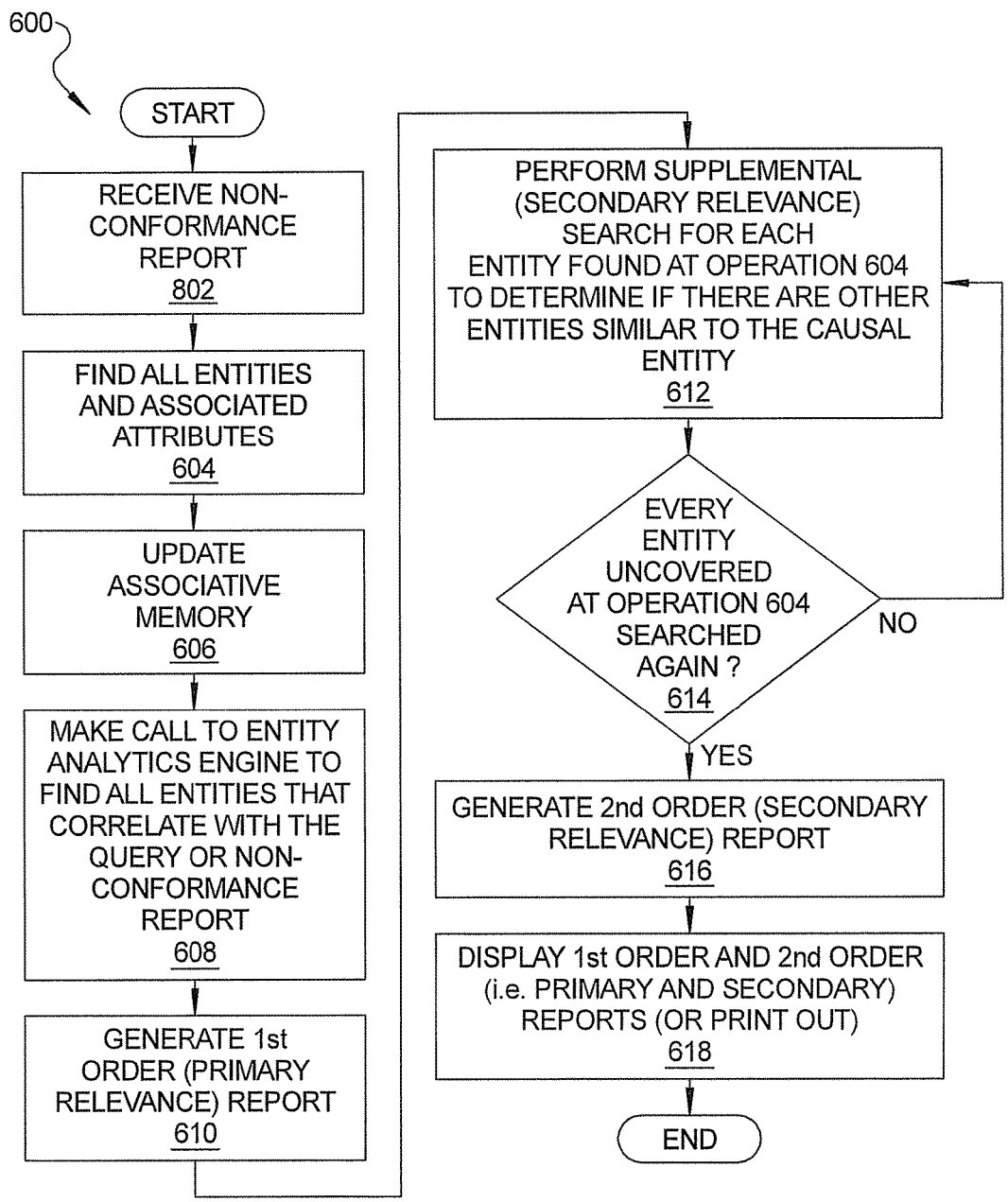
FIG. 7 is a flowchart indicating operations that may be performed by the system in investigating a manufacturing non-conformance situation.

Referring now to FIG. 7, a flowchart 600 is shown of operations that may be performed by the system 10 when it is configured by the system designer for use as a manufacturing non-conformance analysis system. It will be appreciated that when configured as a manufacturing non-conformance system, the system 10 may potentially provide even more exact and more complete entity information than when configured for use as a manufacturing non-conformance detection system. This is because a manufacturing environment is typically more closely controlled and data is typically collected in a more consistent manner than in a post-manufacturing scenario, where various non-related entities may be involved with repair or maintenance of a product or system.

At operation 602 the user inputs a manufacturing non-performance report via the computer display terminal 22. This report may be a free text query that describes the non-conformance using one or more of words, numbers, dates, part numbers, names, serial numbers or phrases. The query software 24 controls the entity analytics engine 21 to perform an initial or "primary" search that is comprised of repeated searches of the associative memory 20 to find all entities with attributes that may be relevant to the information in the non-conformance report input by the user, and turned into entities and attributes, as indicated at operation 604. At operation 606, for each entity determined at operation 604, the associative memory 20 is updated to include the provided non-conformance information in the search query input by the user. Note that the non-conformance that is being investigated is a non-conformance that may need to be added to the associative memory 20 because it might itself be a key to a root cause.

At operation 608 a call is made to the entity analytics engine 21 to find all entities that correlate with the query or non-conformance report. This may be viewed as an "initial" search or a "first order" search. The entity analytics engine 21 returns a list of associated entities. This list is then formatted into a report at operation 610. This report may be termed a "first order" report or "primary relevance" report (indicated by reference number 26a in FIG. 1) and involves a listing of the entities having information with attributes that closely or directly involve the manufacturing non-conformance. Thus, from the first order or primary relevance report, the associations of all of the entities having attributes that are closely associated with the non-conformance will be apparent to the user to allow for a thorough situational awareness of the non-conformance issue being investigated.

Referring further to FIG. 7, at operation 612 the system 10 may perform a "supplemental" or "second order" search of the associative memory 20 for each entity that was retrieved at operation 604 and deemed by a systems manufacturing engineer (SME) as possibly the cause (or contributing cause) of the non-conformance. The supplemental or second order search is made of the causal entities to see if there are other entities in the system that are similar to the causal entity. The key here is that if other entities in the associative memory 20 have a similar non-conformance, then looking at attributes or entities that the similar entities have with the non-conformance entity may yield the root cause of the non-conformance. Note that the supplemental or second order search can be called over and over again to get deeper into the root cause of the non-conformance situation being investigated. For example, looking at manufactures that are having similar non-conformance issues might show that the non-conformance is associated with a raw material that the different manufactures are using in common.

As another example, consider the delamination situation mentioned above. A mechanic, "John", notices that after installing a panel the panel starts delaminating and writes up a non-conformance report. The user of the system 10 then uses that report with the system 10. The system 10 returns a primary report (i.e., report 26a) that summarizes the entities associated with this particular report. Assume that this report returns the following entities: Mechanic: "John", Part Number: A1234, Serial Number: 0002, and Non-conformance Report: NC5678, NC4567, NC3301. The system 10 (specifically the query software 24) then calls the entity analytics engine 21 with each returned entity as the input parameter and asks the entity analytics engine 21 to find other entities similar to the input ones. After all of the calls the query software 24 has a list of all the entities that are associated with the current non-conformance report or query, and for each of those associated entities a list of other entities that are similar (i.e., report 26b in FIG. 1).

Figure 7A:
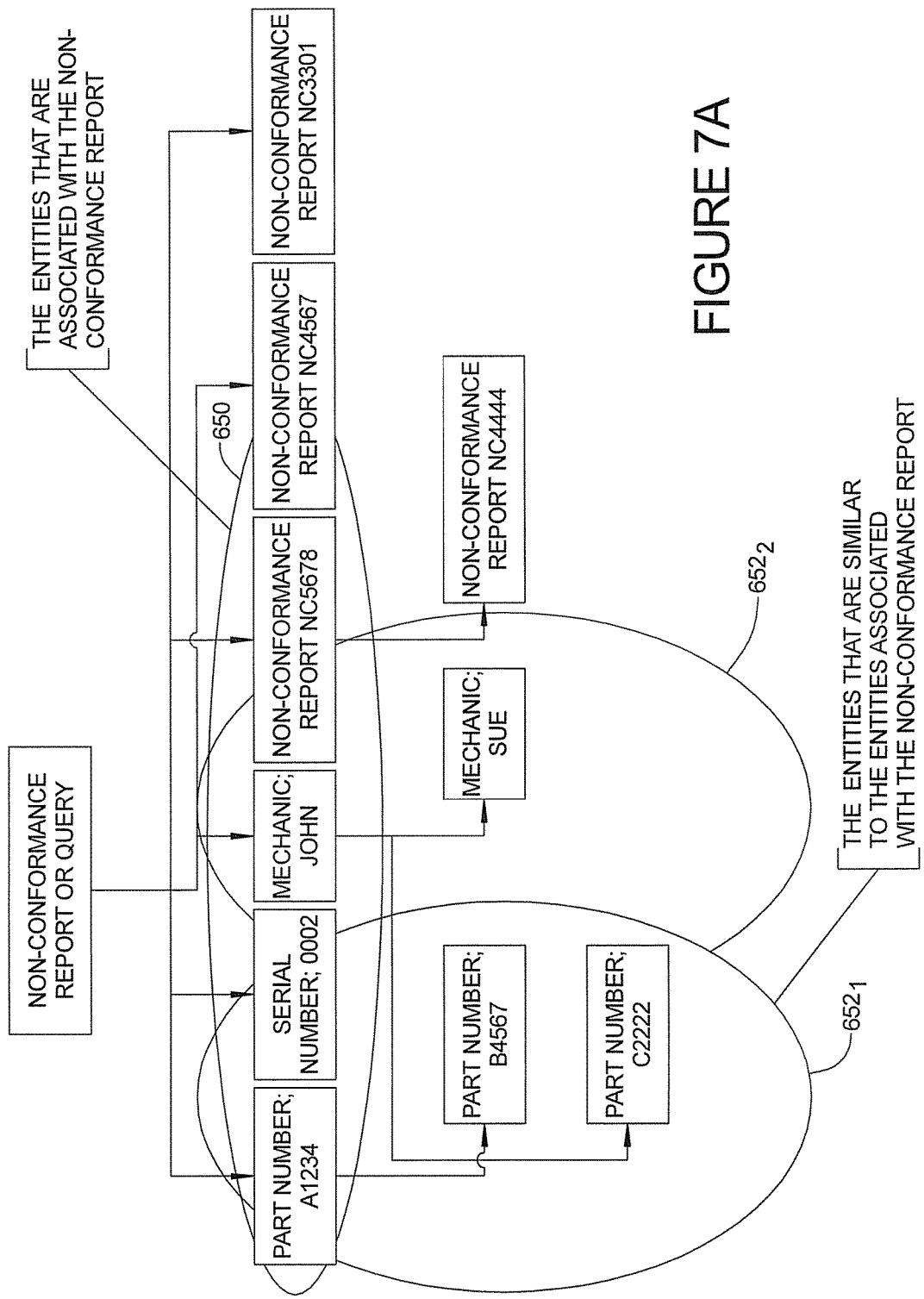
FIG. 7A is a diagram illustrating how the entity analytics engine may identify two groups of entities, one being primarily related to the manufacturing non-conformance information, and the second being entities that are similar to those of the first group, and that may still be helpful in determining a root cause of a non-conformance situation.

The diagram of FIG. 7A illustrates that the first call to the entity analytics engine 21 returns the entities in the horizontal oval 650 (i.e., report 26a). The second set of calls to the entity analytics engine 21 creates the list of entities for each of the different vertical ovals 652 (i.e., second order report 26b). Note that it is possible that there are none, one or many similar entities. All of this information is used to create a second order report on a display for the analyst to view. The analyst may use the second order report to see if any of the associated entities has a history of the non-conformance being investigated in the past. For example, if the part number "A1234" had other incidences of delamination then delamination would be a strong attribute of that part, (i.e., the count of that attribute would be high). The analyst may then look at any parts that are similar to the non-conforming part number and focus on what they have in common. Those that are common because they have the same delamination non-conformance would be examined for common attributes or associations. In this case it could be noted that the similar parts had the same manufacturer in common. Now the analyst knows that the root cause is not the part but has something to do with the specific manufacturer. When the manufacturer resolves a particular non-conformance, then many other non-conformance issues may be resolved at the same time. Another possible example would be that the non-conformance is associated with the mechanic "John". It would be helpful for the analysis performed by the system 10 to check to see if there were other mechanics with the same issue. If the answer is "yes" then this suggests that it is a training issue and not a performance issue on the part of mechanic "John".

The second order report 26b shown in FIG. 1 may have its entities displayed on the computer display terminal 22 or printed out on printer 22a along with the first order or primary relevance report 26a, as indicated at operation 618. The second order report 26b may therefore include entities that have a different (e.g., lesser or "secondary") relevance than the entities listed in the first order report 26*a* at operation 604, but which nevertheless may still be relevant to the non-conformance being investigated. When the entities of the first order and second order reports 26*a* and 26*b*, respectively, are presented together, the entities of the second order report may be particularly useful in revealing possible systemic non-conformance issues by highlighting entity-to-entity relationships that would not have been apparent from the user viewing just the entities listed in the first order report 26*a*. For example, assume that the first order report 26*a* reveals that an adhesive coating used on the parts of a particular subassembly has been identified as being the cause of separation of two secured-together parts. The first order report 26*a* may identify a previously submitted technical bulletin alerting workers to the non-conformance issue and recommending a different adhesive for use. The secondary report 26*b* may also provide a list of other subassemblies, unrelated to the components of the initial non-conformance query, where the adhesive had been used and was associated with a non-conformance. Thus, a potential systemic non-conformance issue with the adhesive may have been discovered.

Figure 8:
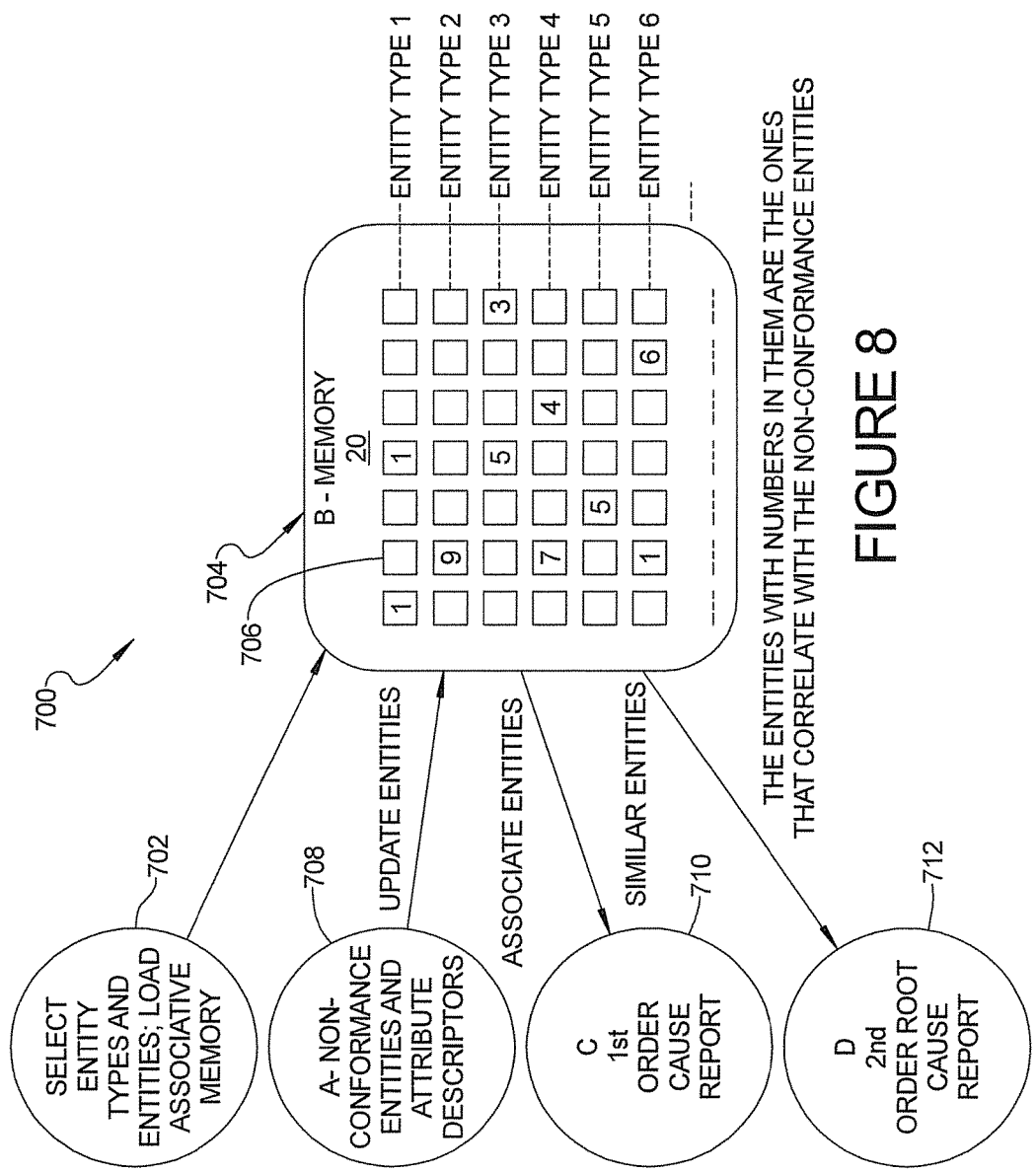
FIG. 8 is a diagram showing various operations that may be performed by the system in analyzing a manufacturing non-conformance situation and generating first and second order reports.

Referring now to FIG. 8, a diagram 700 is shown of the creation and use of a manufacturing non-conformance system such as system 10 in FIG. 1. At operation 702, prior to the first use of the system 10, an entity engineering process is used to create the associative memory 20 that is tailored to a particular manufacturing application (e.g., commercial aircraft construction). The entity engineer identifies the specific entity types and entities that are significant to the specific manufacturing application or enterprise of interest. Historical data is next read into the associative memory 20 so that many entities for each of the different entity types are created. The information related to every historical observation relating to each specific entity is stored in the associative memory 20. The entity types and specific entities are diagrammatically represented as a grid 704 with the rows representing entity types and the entity boxes 706 in each row representing the specific entities associated with a given entity type. Each entity 706 contains different, but specific, information pertaining to its associated entity type. Each entity 706 can have a different quantity of information, so the reader will appreciate that even though the entities are represented by the same size boxes, that each identity is not restricted to only a specific quantity (e.g., bytes) of information. Collectively, all the pertinent entity and entity type information read is stored in, and thus forms, the associative memory 20.

When a non-conformance is found, information about the non-conformance is entered into the system 10 via the keyboard 22*b*. The entity relationship updates are fed into the associative memory 20. The entity analytics engine 21 is called by query software 24 to find and extract all of the entities that represent attributes (i.e., information) most associated with the text or numbers of the non-conformance report/query input that was input by the user. This is represented by operation 708. The entities and attribute descriptors used in the input query are compared using multiple associative memory queries to find entities in the associative memory 20*a* that are significantly correlated with the text or numbers used at operation 708. The correlation results are then collected and presented in operation 710 which is the creation of the first order (primary) report. The first order report lists each retrieved entity and any related information of each specific entity that is stored with the entity that describes how the entity relates to the specific manufacturing non-conformance being investigated. Numbers may be used in each entity box 706 to indicate a score generated by the entity analysis engine that gives an indication of how strongly the entity is associated with the query or non-conformance report. Higher numbers indicate a specific entity is more strongly associated. Bold text for the numbers or larger font size text may also be used to signify to the user the degree of relevance of a particular entity. The algorithm used by the entity analysis engine 21 may vary with every engine and can include such factors at the number of attributes that matched, the number of entities that matched, and the uniqueness of the attribute.

The next operation is to determine how the entities retrieved (i.e., that form the first order report at operation 710) may be related to other entities that were not used to form the first order report. This is achieved by comparing each entity selected and used in the first order report at operation 710 with every other entity in the associative memory 20 of the same entity type. Those that are deemed to be similar are collected and used to form the secondary report as indicated at operation 712. The second order report provides the user with an increased degree of situational awareness of the non-conformance issue being investigated. By this it is meant that the secondary report assists the user in even more fully understanding the scope of the issue being investigated by collecting all of the relevant entities and their attributes that may even just tangentially or marginally relate to the non-conformance query input by the user. In this manner, when several (two or more) entities are similar and associated with a non-conformance, this might be an indication of a "systemic" issue with the production system.

Figure 9:
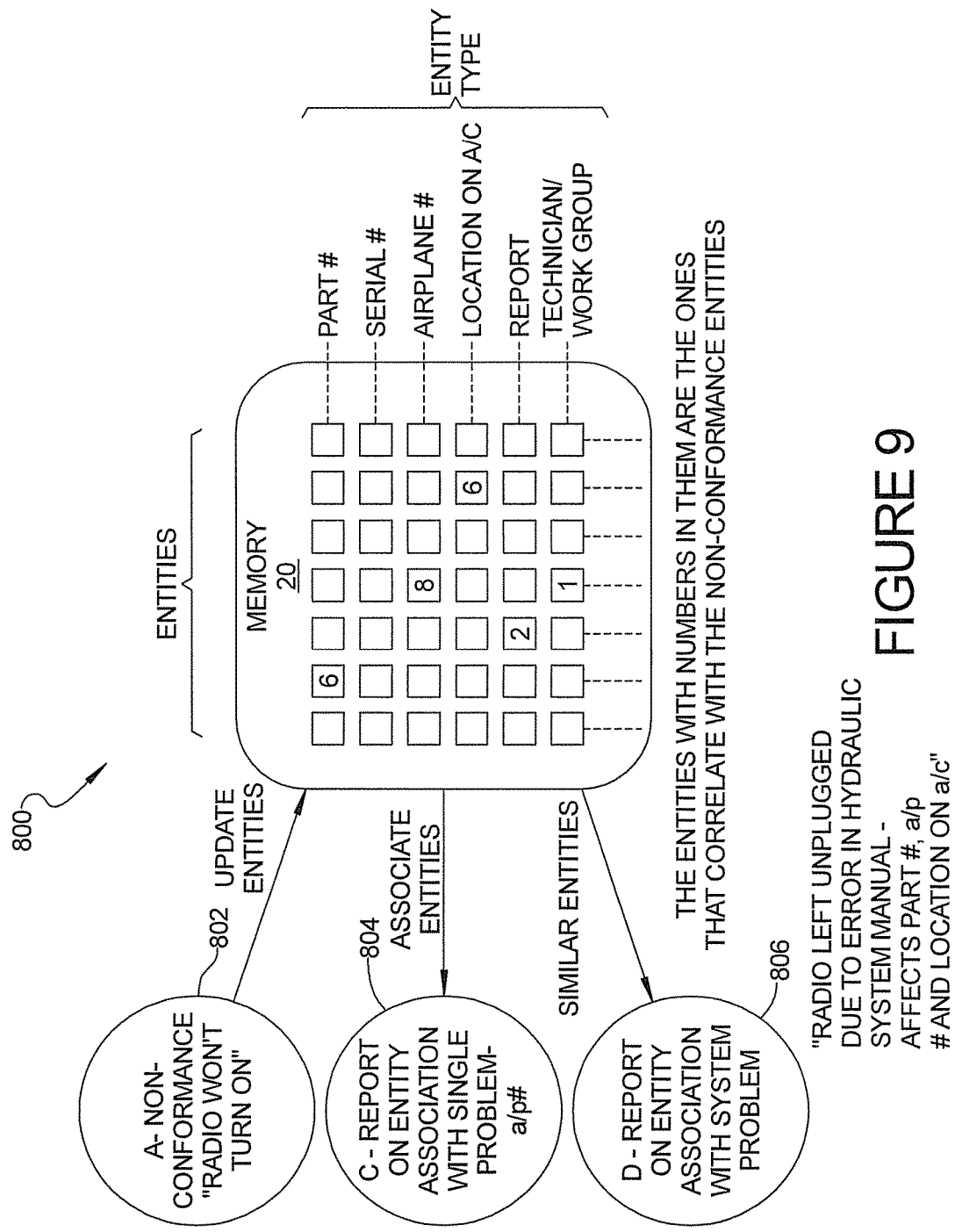
FIG. 9 is a diagram that illustrates a specific example of a manufacturing non-conformance situation.

Referring now to FIG. 9, a diagram 800 is presented to illustrate a specific example of the system 10 being used to investigate a manufacturing non-conformance, in this example associated with a radio during the manufacture of an aircraft. In this example it is assumed that the part number (Part #), part serial number (Serial #), aircraft tail number (Aircraft #), access location on the aircraft ("Location on A/C"), non-conformance report ("Report") and the name of the technician or work group involved with resolving the issue ("Technician/Work Group") are chosen as the entity types. Assume that a radio non-conformance occurs and a report comes in from a runway that the radio is malfunctioning. First, the associative memory 20 is updated with these entities and their associated attribute descriptors. More specifically, the memory subsystem 19 creates a non-conformance entity with a unique non-conformance number, a subject line of "radio problem" and links it with the other entities as associated entities. This may be termed the "radio problem" entity. Thus, the "Airplane #" entity is associated with the radio non-conformance entity. The radio non-conformance entity may be associated with the specific "Technician/Work Group" entity. The specific serial numbered radio entity (Serial #) of the radio experiencing a non-conformance may also be associated with the specific aircraft tail number entity. In short, all the specific entities related to this particular radio non-conformance are associated with each other.

Now that the associative memory 20 is updated with the most current information on the radio non-conformance, it is possible to query the associative memory 20 for all information related to this specific radio non-conformance. The entity analytics engine 21 memory will search the associative memory 20 and return a report summarizing every related entity found that is associated with the radio non-conformance entity. This operation is summarized at operation 804 and may is the first order (or "initial" or "primary")

report 26*a*. In this example the first order report 26*a* may list every non-conformance issue associated with this radio part number, and the report may be displayed to the user (i.e., investigator). At the same time the first order 26*a* report may also show every non-conformance issue associated with the specific serial number. The first order report 26*a* may even display all the non-conformances associated with the particular aircraft tail number on which the radio non-conformance is being experienced, as well as all the non-conformances previously reported by the particular "Technician/ Work Group" involved with the present radio non-conformance. Seeing the summarized history of all the entities associated with the radio non-conformance will give the user a complete perspective of the non-conformance so that the cause can be identified or remembered based on past experience(s).

A particular strength of entity analytics comes from the ability to see a summary of all the entities that are associated with the particular non-conformance being investigated. In this example the summary may make it apparent that the specific radio serial number has had other non-conformances. Such information might provide a clue to the user that the specific part might be investigated for replacement and that the root cause of the radio non-conformance is not somewhere else in aircraft. If it is noted that the Technician/ Work Group that has reported the radio non-conformance is also associated with other non-conformances involving the radio in question, or other electronic components on the same or similar aircraft, then the work group might need additional training to prevent future non-conformance issues.

At operation 806, the second operation of the process may then be to use the entity analytics engine 21 to compare the specific entities directly related to the specific non-conformance issue (i.e., those obtained at operation 804) with all the other entities in the associative memory 20 and to look for similar entities that may be indirectly related to those entities found at operation 804. This is the second order (or "supplemental" or "secondary") search which is reported in secondary search report 26*b*. In this way, potential system level production issues may be revealed that would otherwise not be apparent from examining just the entities of the report generated at operation 804.

In the radio example given above, the part number, the aircraft tail number, and the Technician/Work Group could be compared with other similar entities. If for example the radio part number under investigation has many similar non-conformance reports associated with that part number, it might suggest further investigation of a possible systemic issue with that particular radio part number, rather than just an isolated issue. If the Technical/Work Group is having non-conformances similar to other work groups, then this might point to an issue with the training materials used to train the different work groups. If the particular aircraft tail number was similar to another tail numbered aircraft this also might show a pattern of correlated non-conformances. More specifically, it might reveal a situation where many aircraft tail numbers had the same non-conformance "radio not working", but the set of possible source causes (i.e., root causes) of these non-conformances might be large and not immediately apparent. But when looking for aircraft tail numbers that are most similar to the specific aircraft having the radio non-conformance, one might find that the specific aircraft tail number in question had a similar set of non-conformance issues to previous tail numbers. Thus, it may be determined quickly that the particular aircraft tail number with the radio issue was similar to other aircraft that also had hydraulic issues. This information might reveal that the prior tail numbers of aircraft involved resolving an hydraulic issue, and that on those prior tail numbers of aircraft a radio connecter was ultimately not properly reconnected after a repair to an hydraulic component. In this example the second order search report 26*b* may provide the user with the important clue as to where to first look to find the root cause of the radio issue, which in this example would be a system level issue in re-connecting the radio after a seemingly unrelated hydraulic component repair. Such a potential root cause would be difficult or impossible for the user to identify from just the first order report.

To a manufacturing organization the system 10 may provide significant cost and time savings when addressing manufacturing non-conformance and lifecycle management. Manufacturing non-conformances have heretofore been costly to detect, analyze and repair, and the sooner the discovery is made, the lower the cost in remedying the non-conformance. The system 10 is especially valuable in complex manufacturing operations where complex mobile platforms (aircraft, land vehicles such as cars, trucks, busses and vans), marine vessels (surface ships and underwater vessels), rotorcraft and space vehicles (satellites; manned and unmanned space vehicles) and unmanned vehicles (both air and land vehicles) are being manufactured. The ability to quickly and efficiently identify the cause of a manufacturing non-conformance, as well as to further identify a root cause, can save significant man hours and time in a manufacturing application. The system 10 can also reduce or eliminate the need for recalls or retrofitting components on vehicles or systems after a manufacture is completed because the system 10 enables systemic manufacturing non-conformances to be recognized much easier than pre-existing relational database systems. The system 10 is especially valuable in an assembly line manufacturing application where the need to shut down an assembly line can impose a significant cost on a business. The ability of the system 10 to quickly identify causes, and root causes, of manufacturing non-conformance enables any such instance where an entire assembly line has to be shut down to be limited to a minimum time period.

The system 10 also provides the advantage of being able to "learn" over time as the system is used repeatedly in a manufacturing environment. Thus, the system 10 can become significantly more powerful over time, and thus become even more effective at identifying the cause (or root cause) of a manufacturing non-conformance.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for identifying a specified manufacturing non-conformance between entities, the system comprising:
   a data mining tool configured to retrieve historical attributes related to predefined entity types and related entities from information tools and categorize the retrieved historical attributes in an associative learning memory according to a correlation with the predefined entity types;
   the associative learning memory including a plurality of entity types each pertaining to different manufacturing non-conformances, wherein each entity type includes a grid of related entity values and attribute values;

an entity analytics engine configured to perform a non-reductive search based on all of the words of a free-text query of the associative learning memory with respect to a manufacturing non-conformance specified in the query and determine a strength of correlation based on an occurrence frequency for each specific entity type and entity, the search returning entity and historical attribute values that do not include the specified non-conformance but are highly correlated to the specified non-conformance; and a display device for presenting each returned entity and attribute values with a different color to a user, wherein each different color indicates the occurrence frequency of the particular returned entity.

2. The system of claim 1, wherein the search includes a first order search and a second order search, the second order search returning the entity and attribute values that do not include the specified non-conformance, the first order search returning matrices that include the specified non-conformance.

3. The system of claim 2, further comprising a device for displaying results of said first order search and said second order search together.

4. The system of claim 1, further comprising:
at least one information storage tool that stores historical manufacturing non-conformance information; and
a data mining that retrieves specific attributes from the at least one information storage tool and stores values for the specific attributes in the associative memory.

5. The system of claim 1, further comprising a user interface configured to enable said user to input said specified manufacturing non-conformance.

6. A method for identifying a specified manufacturing non-conformance between entities, the method comprising:
storing a plurality of entities in an associative memory subsystem, each entity containing attributes of information that pertains to a manufacturing application, wherein the associative memory subsystem automatically creates correlations between each stored entity and all of the other stored entities;
performing a non-reductive search based on all of the words of a free-text query of said associative memory subsystem for a specific manufacturing non-conformance to find entities that do not contain the specific non-conformance but are, according to the correlations, highly correlated to the specific non-conformance;
determining a strength of correlation between the found entities and the specific non-conformance based on an occurrence frequency; and
presenting each found entity in a different color on a display device to a user, wherein each different color indicates the occurrence frequency of the particular returned entity.

7. The method of claim 6, wherein the searching further includes finding entities that include the specific non-conformance.

8. The method of claim 7, further comprising ranking the displayed entities according to relevance.

9. The method of claim 6, further comprising mining a database for historical information about manufacturing non-conformances; forming new entities containing attributes mined from the historical information; and storing the new entities in the associative memory subsystem.

* * * * *